T6544

358-74. OR 3,612,756 SR

United States Patent

[11] 3,612,756

[72] Inventors Mitsuharu Akatsu Yokohama-shi; Takao Yoneyama, Yokohama-shi; Tadahiko Iwasaki, Kamakura-shi, all of Japan

[21] Appl. No. 818,926
[22] Filed Apr. 24, 1969
[45] Patented Oct. 12, 1971
[73] Assignee Hitachi, Ltd. Tokyo-to, Japan
[32] Priority Apr. 24, 1968
[33] Japan
[31] 33021/68

[54] BEAM CURRENT LIMITING CIRCUIT FOR A CATHODE-RAY TUBE
6 Claims, 3 Drawing Figs.

[52] U.S. Cl. 178/5.4 R, 178/7.3 DC, 178/7.5 DC
[51] Int. Cl. H04n 9/28
[50] Field of Search 178/5.4, 7.5 DC, 7.3 DC, 6 PS

[56] References Cited
UNITED STATES PATENTS

| | | | |
|---|---|---|---|
| 3,541,240 | 11/1970 | Curtis | 178/5.4 R |
| 2,832,824 | 4/1958 | Oakley | 178/7.5 |
| 3,072,741 | 1/1963 | Ahrons et al. | 178/5.4 |
| 3,309,462 | 3/1967 | Loughlin | 178/7.5 |
| 3,465,095 | 9/1969 | Hansen et al. | 178/5.4 |

*Primary Examiner*—Richard Murray
*Assistant Examiner*—P. M. Pecori
*Attorney*—Craig, Antonelli, Stewart and Hill

ABSTRACT: A beam current limiting circuit for a cathode-ray tube (CRT) having at least a cathode, a grid and an anode comprising an anode circuit having a fly back transformer including a primary coil and a secondary coil, a power source, a high voltage rectifier for rectifying flyback pulses generated across the secondary coil, a beam current responsive means inserted between the power source and the secondary coil, a grid bias means, and switching means. The beam current responsive means is connected to the switching means and generates a control voltage whose value is so determined to be lower than the grid bias voltage while the beam current is larger than a predetermined value.

The switching means is responsive to the control voltage and changes its conductive or nonconductive condition to supply the control voltage to the grid when the beam current exceeds the predetermined value, so that the beam current is prevented from exceeding the predetermined value.

3/

INVENTORS
MITSUHARU AKATSU
TADAO YONEYAMA
TADAHIKO IWASAKI

BY Craig, Antonelli, Stewart & Hill
ATTORNEYS

INVENTORS
MITSUHARU AKAISHI
TAKAO YONEYAMA
TADAHIKO IWASAKI

BY Craig, Antonelli, Stewart & Hill

ATTORNEYS

BEAM CURRENT LIMITING CIRCUIT FOR A CATHODE-RAY TUBE

This invention relates to a beam current limiting circuit for controlling the operation of a cathode-ray tube, as used in a television receiver, or other cathode-ray tube system. Particularly, this invention is applicable to a color television receiver for limiting the beam current in the color cathode-ray tube.

Excessive beam current flow in the cathode-ray tube is responsible for many defects in the operation of television receivers, especially for color television receivers. In a black and white television receiver, the cathode-ray tube has only one electron gun, and so the beam current therein does not reach such a high level as to be considered excessive and therefore does not produce the grave defects in operation normally attributed to excessive beam current. Therefore it has not been considered necessary to use a beam current limiting circuit in a black and white television receiver. But in a color television receiver, especially in a transistorized color television receiver, it is necessary to use beam current limiting circuit for the following reasons.

1. In a color television receiver DC voltage components are necessarily transmitted with color signals. Thus, beam current flowing through a color cathode-ray tube becomes about 10 times as large as that of a black and white cathode-ray tube, since the color cathode-ray tube usually employs three electron guns and is operated with higher voltages as compared with those of the black and white cathode-ray tube. Accordingly, if an excessive beam current is allowed to flow through the color cathode-ray tube, the temperature of the shadow mask will rise up and it may become distorted due to the heating thereof. This brings about a degeneration of the purity and focus in the cathode-ray tube image. 2. Due to the occurrence of the excessive beam current, the circuit for generating the high DC voltage may become over-loaded and the horizontal deflection circuit, especially the horizontal output stage, connected thereto may be destroyed.

3. Furthermore, as a result of the excessive current flow, the load current of the power supply circuit increases to a high level and thus the power supply circuit may be destroyed by this condition.

To prevent or suppress the excessive beam current flowing through a color cathode-ray tube, it has been a conventional technique to amplify the voltage derived from the cathode of the high-voltage rectifying diode by way of a resistor circuit and supply it to the color video signal amplifying transistors which directly connected to the color video signal driving transistors, so that the beam current is controlled. But such a conventional beam current limiting circuit is costly on account of the need for using the control signal amplifier. Furthermore this beam current limiting circuit can not be used in the color television receiver in which a high-voltage regulator is used.

SUMMARY OF THE INVENTION

An object of this invention is to provide a new and useful beam current limiting circuit for a cathode-ray tube such as used in a television receiver or other cathode-ray tube circuit.

Another object of this invention is to provide a less expensive beam current limiting circuit.

Still another object of this invention is to provide a beam current limiting circuit that can be applied to color television receivers in which a high-voltage regulator is used.

Further object of this invention is to provide a beam current limiting circuit of simple construction.

According to the present invention, there is provided a beam current limiting circuit for a cathode-ray tube having at least a cathode, a grid and an anode comprising a video signal output circuit connected to said cathode for supplying thereto video signals which control a beam current flowing through the anode of said cathode-ray tube; an anode circuit connected to said anode and comprising a power source, a flyback transformer including a primary coil and a secondary coil for generating flyback pulses and a high-voltage rectifier connected to one of the terminals of said secondary coil for rectifying the flyback pulses generated across said secondary coil, so that a high DC voltage is supplied to the anode of said cathode ray tube; grid bias means for supplying a grid bias voltage to said grid; beam current responsive means inserted between said power source and the other one of the terminals of said secondary coil for generating a control voltage having a value which changes inversely with respect to the change in said beam current, said control voltage having a value equal to or lower than said grid bias voltage when said beam current is equal to or larger than a predetermined value, respectively; and switching means having conductive and nonconductive states and being responsive to said control voltage to selectively supply to said grid either said grid bias voltage in response to said beam current being equal to or lower than a predetermined value or said control voltage in response to said beam current being larger than said predetermined value, thereby preventing said beam current from exceeding said predetermined value.

In the present invention, the video signal output circuit may be a black and white video signal output circuit, a color video signal output circuit or a color difference signal output circuit. In addition, the invention can be applicable to the type of color television received in which color difference signals are supplied to the cathodes of the cathode-ray tube, and black and white video signals (luminance signals) are supplied to the grids of the tube.

In the present invention, the beam current responsive means comprises a resistor, and a parallel circuit of a resistor and a condenser or other equivalent element. The switching means may be provided as a diode, transistor, voltage dependent resistor or other means which can selectively adopt either a conductive or nonconductive condition. In accordance with the present invention, the switching means provides conductive and nonconductive states and changes its condition in response to the control voltage generated from the beam current responsive means while the beam current is larger than a predetermined value. By changing its condition while the beam current is larger than the predetermined value, the control voltage is supplied to the grid of the cathode-ray tube, so that the beam current is prevented from exceeding this predetermined value.

In the present invention, if the anode circuit has no resistor or other beam current responsive means, it is difficult to detect the change in the beam current flowing through the cathode-ray tube. For this reason use of beam current responsive means is essential. Furthermore, by using the beam current responsive means, the upper limit of the beam current is determined by the value of the resistor of the beam current responsive means.

These and other objects, features and advantages of the present invention will become more apparent from the following detailed description thereof when taken with the accompanying drawings, which illustrate several embodiments of the invention.

DESCRIPTION OF THE PREFERRED EMBODIMENT

Figure 1:
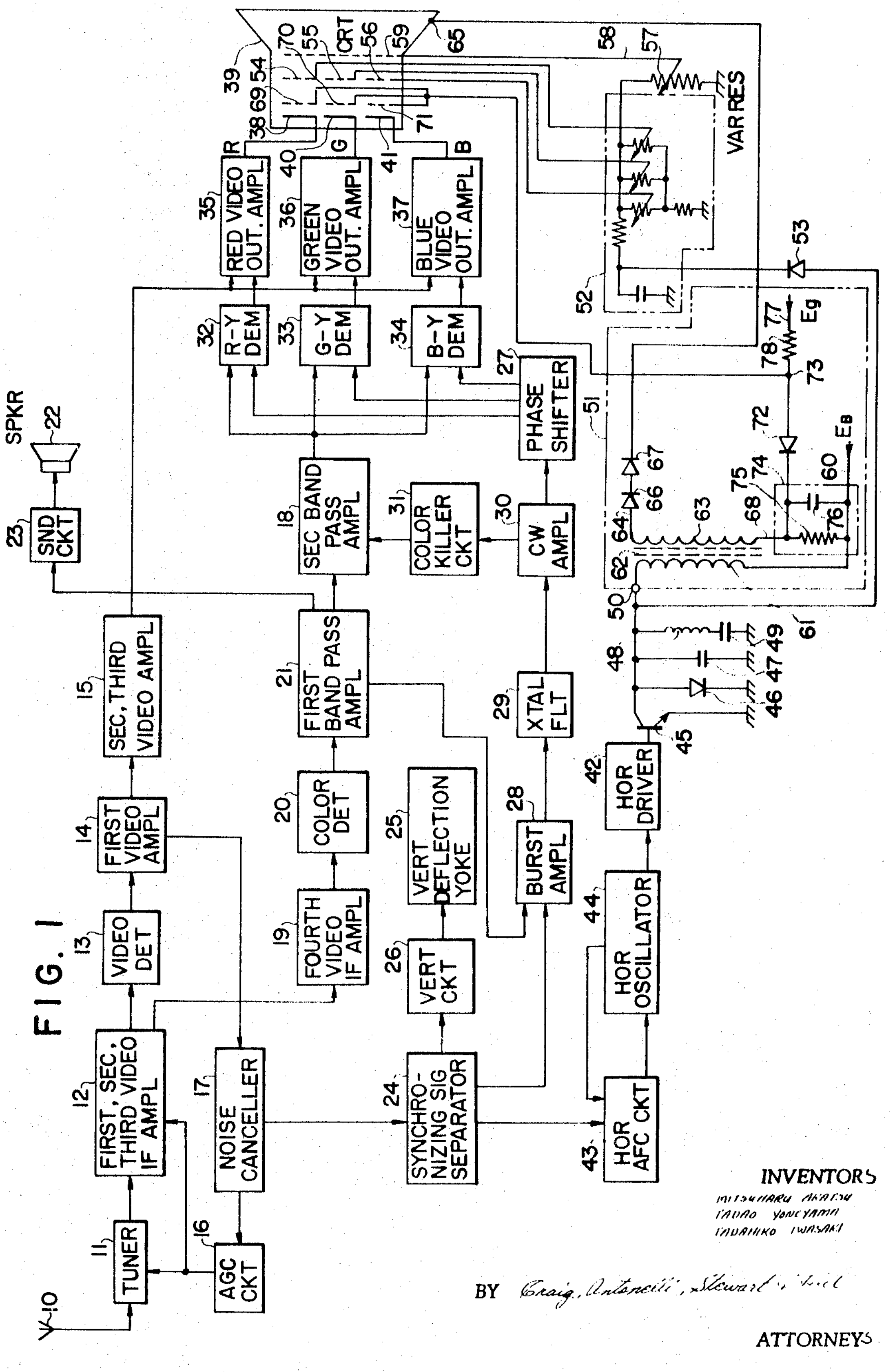
FIG. 1 is a schematic block diagram of a color television receiver including one embodiment of a beam current limiting circuit constructed in accordance with the present invention.

Referring to FIG. 1 there is represented a color television receiver embodying a beam current limiting circuit for a cathode-ray tube in accordance with the invention. The color television receiver includes an antenna 10 coupled to a tuner 11, having a radiofrequency amplifier of any desired number of stages, an oscillator and a mixer. Coupled in cascade with the output circuit of the tuner 11 are a video intermediate frequency amplifier 12, having first, second and third stages, a video detector 13, a first video amplifier 14, and a second video amplifier 15, providing second and third amplifier stages. An output terminal of the first video amplifier 14 is coupled to an input terminal of an automatic gain control (AGC) circuit 16 through a noise canceller 17. An output of the AGC circuit 16 is coupled to the radiofrequency amplifier of the tuner 11 and the video intermediate frequency amplifier 12, respectively.

An output terminal of the video intermediate frequency amplifier 12 is coupled to a second band-pass amplifier 18 through a fourth video amplifier 19, a color detector 20 and a first band-pass amplifier 21. An output terminal of the first band-pass amplifier 21 is coupled to a speaker 22 through a sound circuit 23 including a sound intermediate frequency amplifier of any desired number of stages, a sound demodulator, and an audio amplifier of any desired number of stages.

An output terminal of the noise canceller 17 is coupled to a synchronizing signal separator 24. A first output terminal of the synchronizing signal separator 24 is coupled to a vertical deflection yoke 25 through a vertical circuit 26 including a vertical oscillator, a vertical driver and a vertical output amplifier. A second terminal of the synchronizing signal separator 24 is coupled to a phase shifter 27 through a burst amplifier 28, a crystal filter 29 and a continuous wave amplifier 30 which generates color reference signals. An output terminal of the first band-pass amplifier 21 is coupled to an input terminal of the burst amplifier 28. An output terminal of the continuous wave amplifier 30, is coupled to a color killer circuit 31, an output terminal of which is coupled to the second band-pass amplifier 18.

An output terminal of the second band-pass amplifier 18 is coupled to an R–Y demodulator 32, a G–Y demodulator 33 and a B–Y demodulator 34 respectively. In addition, respective output terminals of the phase shifter 27 are also coupled to the R–Y demodulator 32, the G–Y demodulator 33 and the B–Y demodulator 34. An output terminal of the second video amplifier 15 is coupled respectively to a red video output amplifier 35, a green video output amplifier 36 and a blue video output amplifier 37. An output terminal of the R–Y demodulator 32 is coupled to cathode 38 of a cathode-ray tube 39 through the red video output amplifier 35. An output terminal of the G–Y demodulator 33 is coupled to cathode 40 of the cathode-ray tube 39 through the green video output amplifier 36. An output terminal of the B–Y demodulator 34 is coupled to cathode 41 of the cathode-ray tube 39 through the blue output amplifier 37.

A third output terminal of the synchronizing signal separator 24 is coupled to a horizontal automatic frequency control (AFC) circuit 43 which is in turn connected to a horizontal oscillator 44. An output terminal of the horizontal oscillator 44 is coupled back to the input terminal of horizontal AFC circuit 43 and is also connected to a horizontal driver 42. The output of the horizontal driver 42 is connected to a base of a horizontal output transistor 45. The emitter of the transistor 45 is grounded. The collector of the transistor 45 is connected to a parallel circuit of a damper diode 46, a condenser 47 and a serially connected circuit of a horizontal deflection yoke 48 and a condenser 49. The condenser 49 is used to compensate the wave form of the horizontal deflection current.

The collector of the transistor 45 is further connected to an input terminal 50 of a beam current limiting circuit 51 which is constructed in accordance with the present invention.

The collector of the transistor 45 is still further connected to an input terminal of a screen voltage regulator 52 through a diode 53. The screen voltage regulator 52 has three output terminals. The respective output terminals of the screen voltage regulator 52 are connected respectively to screen grids 54, 55 and 56 of the tube 39. A variable resistor 57 used to regulate the focusing voltage is connected between the screen voltage regulator 52 and ground. A slidable terminal 58 of the variable resistor 57 is connected to a focusing electrode 59 of the cathode-ray tube 39.

The input terminal 50 of the beam current limiting circuit 51 is connected to a terminal 60 of a power supply source (not shown) through a primary coil 61 of a flyback transformer 62. A secondary coil 63 of the flyback transformer 62 is coupled to the primary coil 61. A terminal 64 of the secondary coil 63 is connected to an anode 65 of the cathode-ray tube 39 through high-voltage rectifying diodes 66, 67. The other terminal 68 of the secondary coil 63 is connected to three control grids 69, 70 and 71 through a diode 72. Further, the three control grids 69, 70 and 71 are connected to a terminal 73. The terminal 68 is further connected to the terminal 60 through a beam current responsive element 74 which is formed, for example of the parallel circuit of a resistor 75 and a condenser 76. The terminal 73 is connected to the terminal 77 of a power supply source (not shown) through a resistor 78.

Considering briefly the general operation of the receiver of FIG. 1 as a whole, color television signals including black and white video signals, R (red), G (green), B (blue) color video signals, synchronizing signals and burst signals received by the antenna 10 are selected, amplified, and converted into intermediate frequency signals in the tuner 11. Intermediate frequency signals are supplied to the video intermediate frequency amplifier 12 and are delivered to the video detector 13. The composite video signals including the black and white video signals and synchronizing signals are derived by the video detector 13 and are supplied to the first and the second video amplifiers 14 and 15. The composite video signals derived from the first video amplifier 14 are also supplied to the noise canceller 17 wherein noises having large amplitude as compared with the synchronizing signals are cancelled, and then the composite video signals are supplied to the AGC circuit 16. The AGC signals derived from the AGC circuit 16 are supplied to the radiofrequency amplifier in the tuner 11 and to the video intermediate frequency amplifier 12 to control the gain of those stages.

The intermediate frequency signals derived from the video intermediate frequency amplifier 12 are also supplied to the fourth video intermediate frequency amplifier 19 and are selectively amplified, then delivered to the color detector 20. The color signals including R (red), G (green) and B (blue) video signals and burst signals derived from the color detector 20 are supplied to the second band-pass amplifier 18 through the first band-pass amplifier 21 wherein the color signals are selectively amplified.

The synchronizing signals derived from the noise canceller 17 are supplied to the synchronizing signal separator 24. The vertical synchronizing signals derived from the synchronizing signal separator 24 are supplied to the vertical circuit 26 wherein the vertical oscillator operates in synchronism with the vertical synchronizing signals and the output signals of the vertical oscillator are amplified in the vertical output circuit. The oscillating signals are supplied to the vertical deflection yoke 25 and the sawtooth current flows in the vertical deflection yoke 25 to deflect the electron beam in the cathode-ray tube 39 for a vertical direction. The horizontal synchronizing signals derived from the synchronizing signal separator 24 and the color signals derived from the first band-pass amplifier 21 are supplied to the burst amplifier 28 wherein the burst signals are extracted from the color signals and supplied to the crystal filter 29. The ringing wave signals (continuous wave signals) derived from the burst signals in the crystal filter 29 are supplied to the continuous wave amplifier 30 wherein the amplitude of the continuous wave signals is amplified. The continuous wave signals whose frequency is equal to that of the burst signals are supplied to the color killer circuit 31. The color killer signals are supplied to the second band-pass amplifier 18 and make amplifier 18 nonconductive for a black and white television transmission.

Further, the continuous wave signals are supplied to the phase shifter 27. The color signals derived from the second band-pass amplifier 18 and the continuous wave signals derived from the phase shifter 27 are supplied respectively to the R–Y demodulator 32, the G–Y demodulator 33 and the B–Y demodulator 34. The R–Y color difference signals demodulated in the R–Y demodulator 32, and the black and white video signals derived from the second video amplifier 15 are supplied to the R (red) video output amplifier 35, from which R (red) video signals are derived and supplied to the cathode 38 of the cathode-ray tube 39. The G–Y color difference signals demodulated in the G–Y demodulator 33 and the black and white video signals derived from the second video amplifier 15 are supplied to the green video output amplifier 36, from which G (green) video signals are derived and supplied to the cathode 40 of the cathode-ray tube 39. The B–Y color difference signals demodulated in the B–Y demodulator 34 and the black and white video signals derived from the second video amplifier 15 are supplied to the B (blue) video output amplifier 37, from which blue video signals are derived and supplied to the cathode 41 of the cathode-ray tube 39. By supplying R, G, B video signals to the respective cathodes 38, 40, 41 of the tube 39, color images are reproduced in the cathode-ray tube 39.

The horizontal synchronizing signals derived from the synchronizing signal separator 24 and horizontal oscillating signals derived from the horizontal oscillator 44 are supplied to the horizontal automatic frequency control (AFC) circuit 43 wherein automatic frequency control signals are derived and supplied to the horizontal oscillator 44 to synchronize the oscillating signals with the horizontal synchronizing signals. The oscillating signals derived from the horizontal oscillator 44 are supplied to the horizontal driver 42 and output signals of the horizontal driver 42 are supplied to the base of the horizontal output transistor 45. By well-known operation, a current having a sawtooth wave form flows in the horizontal deflection yoke 48 and deflects the electron beam for a horizontal direction. The flyback pulses generated between the collector of the transistor 45 and ground are rectified by the diode 53 and supplied to the screen voltage regulator 52. The voltages derived from the screen voltage regulator 52 are supplied to the screen grids 54, 55 and 56, respectively. The focusing voltages derived from the variable resistor 57 are supplied to the focusing electrode 59 and the focus of the cathode-ray tube 39 is controlled.

The sound signals derived from the first band-pass amplifier 21 are supplied to the sound circuit 23 wherein the sound signals are amplified in the sound intermediate frequency amplifiers, demodulated in the demodulator and further amplified in the audio amplifiers. The audio signals derived from the sound circuit 23 are supplied to the speaker 22 where the electric signals are translated to sound.

Referring now in particular to the beam current limiting circuit 51 of FIG. 1, the flyback pulses generated across the secondary coil 63 of the flyback transformer 62 are rectified by the diodes 66, 67 and supplied to the anode 65 of the cathode-ray tube 39 in the well-known manner. The beam current flows through the parallel connected circuit of the resistor 75 and the condenser 76, the secondary coil 63 of the fly back transformer 62, the diode 66, 67 and cathode-ray tube 39. The condenser 76 is used for bypassing AC components and for smoothing DC components.

In the beam current limiting circuit of FIG. 1, a voltage $E_B$ is supplied to the terminal 60 and a voltage $E_g$ is supplied to the terminal 77. When no beam current flows through the cathode-ray tube 39, no current flows through the resistor 75, the secondary coil 63 and the diodes 66, 67. Therefore, the voltage at the terminal 68 is maintained at $E_B$ and the voltage at the grids 69, 70 and 71 is maintained at $E_g$. According to the invention, the voltages $E_B$ and $E_g$ are so determined that the following inequality 1 is satisfied; thus, the diode 72 is a nonconductive condition and the voltage of the grids 69, 70 and 71 is maintained at $E_g$:

$E_B > E_g$ (1)

If the mean value of the beam current $I_B$ flows through the resistor 75, the voltage at the terminal 68 becomes $E_B - R \cdot I_B$, where $R$ is the resistance value of the resistor 75, and if the beam current $I_B$ does not increase to a predetermined value $I'_B$, the diode 72 is still retained in its nonconductive condition and the following inequality 2 is satisfied:

$E_B - R \cdot I_B > E_g$ (2)

But when the beam current is equal to the predetermined value $I'_B$, the voltage at the terminal 68 ($E_B - R \cdot I_B$) is equal to the voltage at the grids 69, 70 and 71 ($E_g$), but the voltage $E_g$ still supplied to the grid 69, 70, 71 of the tube 39. When the beam current exceeds the predetermined value $I'_B$, the following inequality 3 is satisfied, so that the diode 72 becomes conductive and the voltage $E_B - R \cdot I_B$ whose value is lower than the voltage $E_g$ is supplied to the grids 69, 70, 71 of the tube 39.

$E_B - R \cdot I_B < E_g$ (3)

Therefore, the beam current flowing through the cathode-ray tube 39 decreases.

As the beam current decreases when the beam current exceeds the predetermined maximum beam current (predetermined beam current) $I'_B$ is determined approximately in accordance with the following equation.

$I'_B \ (E_B - E_g)/R$ (4)

As described above, the beam current is prevented from exceeding the maximum beam current $I'_B$ and the maximum beam current does not change depending on the amplitude of the signal and the adjusting of the brightness control. Therefore, excessive flow of beam current through the cathode-ray tube 39 can be prevented.

Modifications of the beam current limiting circuit for the cathode-ray tube of FIG. 1 are described in connection with FIG. 2 and FIG. 3 hereinafter. Corresponding units in FIGS. 1, 2 and 3 are designated by the same reference numerals while analogous units are indicated in the portion of the receiver of FIGS. 2 and 3 by the same reference numerals as units in FIG. 1.

Figure 2:
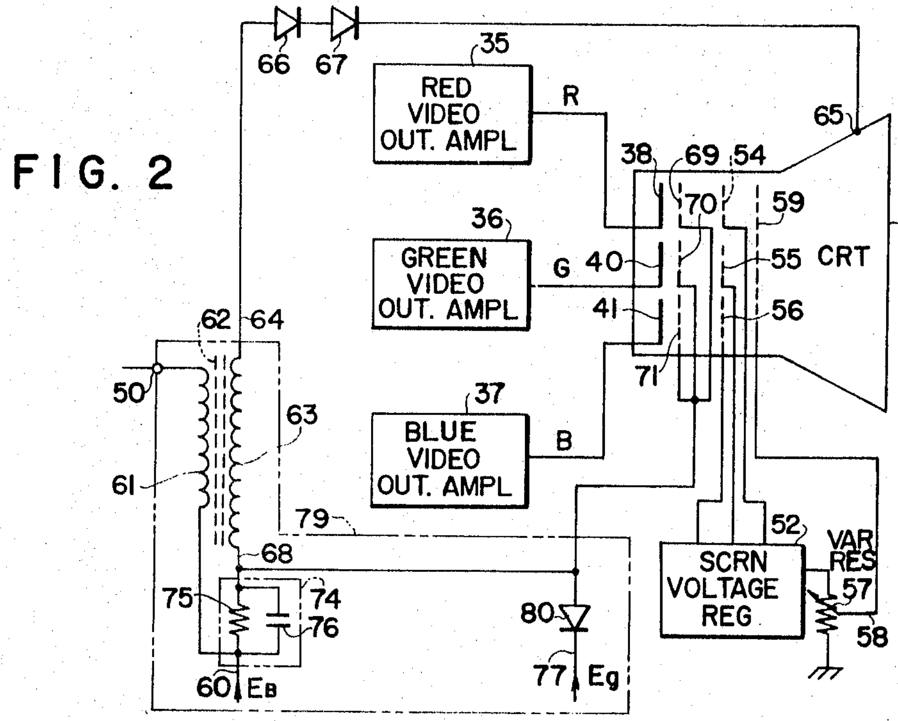
FIG. 2 and FIG. 3 are schematic diagrams; illustrating modifications of the beam current limiting circuit of the invention for the cathode-ray tube system of FIG. 1.

In a beam current limiting circuit 79 in FIG. 2, the terminal 68 of the beam current responsive element 74 is connected to the terminal 77 of a grid bias source (not shown) through a diode 80 and is further connected to the grids 69, 70 and 71 of the cathode-ray tube 39. In this embodiment, as the voltage at the terminal 68 changes in inverse proportion to the change in the beam current flowing through the resistor 75, the value of the resistor 75 may be so determined that the voltage at the terminal 68 is equal to or higher than the grid bias voltage $E_g$ at the terminal 77 while the beam current is equal to or less than the predetermined value, respectively and the voltage at the terminal 68 is lower than the grid bias voltage $E_g$ while the beam current is larger than the predetermined value. While the voltage at the terminal 68 is equal to or higher than the grid bias voltage, the diode 80 is retained in its conductive condition. Therefore, the grid bias voltage $E_g$ is supplied to the grids 69, 70 and 71 of the tube 39 and the voltage at the grids 69, 70 and 71 is maintained at the level of the grid bias voltage $E_g$ while the beam current is equal to or less than the predetermined value.

While the voltage at the terminal 68 is lower than the grid bias voltage $E_g$, the diode 80 is in its nonconductive condition, so that the voltage at the terminal 68 whose value is lower than the grid bias voltage is supplied to the grids 69, 70 and 71 and the beam current decreases. Therefore, the beam current is prevented from exceeding the predetermined value.

Figure 3:
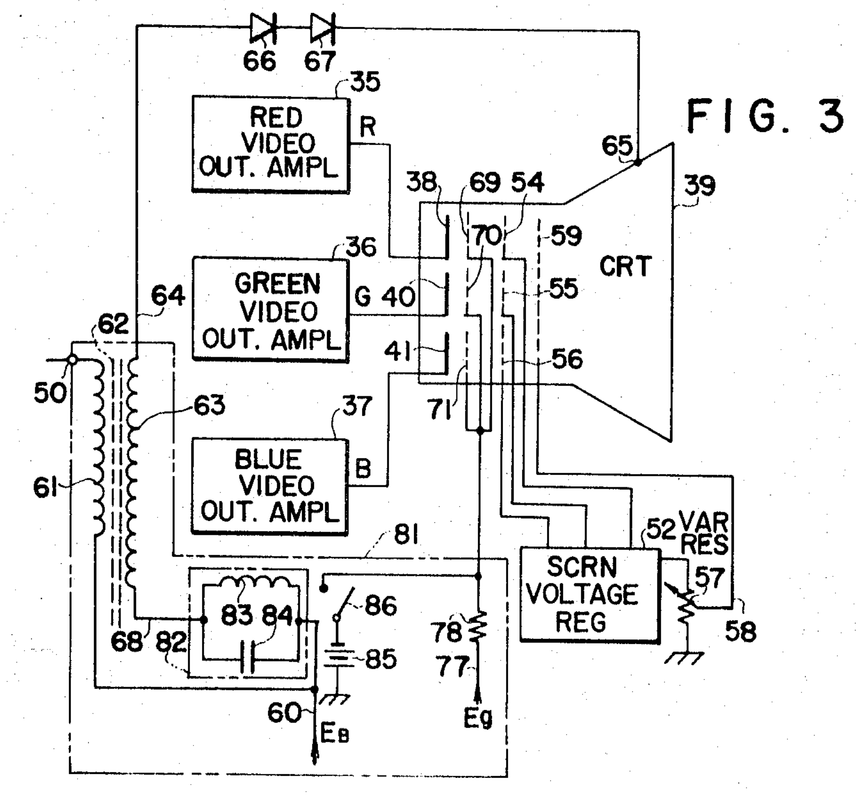

FIG. 3 is a circuit diagram illustrating another modification of the beam current limiting circuit for the cathode-ray tube system of FIG. 1. In beam current limiting circuit 81, a beam current responsive element 82 is inserted between the terminal 60 and the terminal 68, and is constructed with a parallel connected coil 83 and condenser 84, which condenser 84 is used for bypassing high-frequency signals in the beam current. A reference DC voltage source 85 and a single pole switch 86 are serially connected and selectively inserted between the grids 69, 70 and 71 of the tube 39 and ground. The junction between the grids 69, 70 and 71 of the tube 39 and the single-pole switch 86 is connected to the terminal 77 through the resistor 78. The coil 83 and the single-pole switch 86 constitute a relay such that a minimum operating current through coil 83 will close switch 86.

The reference DC voltage generated the reference DC voltage source 85 is lower than the grid bias voltage $E_g$. The beam current flows through the coil 83, the secondary coil 63 and the diode 66, 67, so that the coil 83 generates a magnetizing force, the intensity of which increases in proportion to the increase in beam current.

The single-pole switch 86 is closed by the magnetizing force when the intensity of the magnetizing force attains a predetermined value corresponding to the minimum operating current of the relay. Therefore, the relay is constructed such that the single-pole switch 86 is closed while the beam current is larger than the predetermined value, and the single-pole switch 86 is retained in the open condition (nonconductive condition), while the beam current is equal to or less than the predetermined value. The grid bias voltage $E_g$ is supplied to the grids 69, 70 and 71 of the tube 39. But when the beam current exceeds the predetermined value, the single-pole switch 86 is closed, and its closed condition is retained while the beam current is larger than the predetermined value, so that the reference DC voltage whose value is lower than the grid bias voltage $E_g$ is supplied to the grid 69, 70 and 71 of the tube 39. In this way, the beam current is prevented from exceeding the predetermined value.

Since many modifications and variations may be made in the described apparatus without departing from the spirit of the invention, the foregoing description is to be considered as exemplary and not in a limiting sense. It is therefore to be understood that many changes may be made in the particular embodiment disclosed which are within the full intended scope of the invention as apparent to those of ordinary skill in the art.

We claim:

1. A beam current limiting circuit for a cathode-ray tube having at least a cathode, a grid and an anode comprising: a video signal output circuit connected to said cathode for supplying thereto video signals which control a beam current flowing through the anode of said cathode-ray tube; and anode circuit connected to said anode and comprising a power source, a flyback transformer including a primary coil and a secondary coil for generating flyback pulses and a high-voltage rectifier connected to one of the terminals of said secondary coil for rectifying the flyback pulses generated across aid secondary coil, so that a high DC voltage is supplied to the anode of said cathode-ray tube; grid bias means for supplying a grid bias voltage to said grid; beam current responsive means inserted between said power source and the other one of the terminals of said secondary coil for generating a control voltage having a value which changes inversely with respect to the change in said beam current, said control voltage having a value equal to or lower than said grid bias voltage when said beam current is equal to or larger than a predetermined value, respectively; and switching means having conductive and nonconductive conditions and being responsive to said control voltage to selectively supply to said grid either said grid bias voltage in response to said beam current being equal to or less than a predetermined value or said control voltage in response to said beam current being larger than said predetermined value, thereby preventing said beam current from exceeding said predetermined value.

2. A beam current limiting circuit for a cathode-ray tube having at least a cathode, a grid and an anode comprising: a video signal output circuit connected to said cathode for supplying thereto video signals which control a beam current flowing through the anode of said cathode-ray tube; an anode circuit connected to said anode and comprising a power source, a flyback transformer including a primary coil and a secondary coil for generating flyback pulses and a high-voltage rectifier connected to one of the terminals of said secondary coil for rectifying the flyback pulses generated across said secondary coil, so that a high DC voltage is supplied to the anode of said cathode-ray tube; grid bias means connected to said grid for supplying a grid bias voltage thereto; beam current responsive means having a resistor inserted between said power source and the other one of the terminals of said secondary coil for generating a control voltage having a value which changes inversely with respect to the change in said beam current, said control voltage being equal to or lower than said grid bias voltage at the grid of said cathode-ray tube while said beam current is equal to or larger than a predetermined value, respectively; and switching means supplied with a voltage corresponding to the difference between said control voltage and said grid bias voltage to be held in a nonconductive condition when said beam current is equal to or lower than said predetermined value for supplying said grid bias voltage to said grid and to be rendered conductive while said beam current is larger than said predetermined value for transmitting said control voltage therethrough to said grid, so that the voltage at said rid is decreased to said control voltage level, thereby preventing said beam current from exceeding said predetermined value.

3. A beam current limiting circuit for a cathode-ray tube having at least a cathode, a grid and an anode comprising: a video signal output circuit connected to said cathode for supplying thereto video signals which control a beam current flowing through the anode of said cathode-ray tube; an anode circuit connected to said anode and comprising a power source, a flyback transformer including a primary coil and a secondary coil for generating flyback pulses and a high voltage rectifier connected to one of the terminals of said secondary coil for rectifying the flyback pulses across said secondary coil, so that a high DC voltage is supplied to the anode of said cathode-ray tube; grid bias means connected to said grid for supplying a grid bias voltage thereto; a resistor inserted between said power source and the other one of the terminals of said secondary coil for generating a control voltage, said control voltage changing inservely with respect to the change in said beam current and being equal to or lower than said grid bias voltage at the grid of said cathode-ray tube while said beam current is equal to or larger than a predetermined value, respectively; and a diode having a cathode connected to the junction between said resistor and the other one of the terminals of said secondary coil and an anode connected to the junction between said grid of said cathode-ray tube and said grid bias means, so that said diode is supplied with a voltage corresponding to the difference between said grid bias voltage and said control voltage so as to be held in a nonconductive condition when said beam current is equal to or lower than said predetermined value for supplying said grid bias voltage to said grid and to be rendered conductive while said beam current is larger than said predetermined value for transmitting said control voltage therethrough to said grid, thereby decreasing the voltage at said grid to said reference voltage level and preventing said beam current from exceeding said predetermined value.

4. A beam current limiting circuit for a cathode-ray tube having at least a cathode, a grid and an anode comprising: a video signal output circuit connected to said cathode for supplying thereto video signals which control a beam current flowing through the anode of said cathode-ray tube; an anode circuit connected to said anode and comprising a power source, a flyback transformer including a primary coil and a secondary coil for generating flyback pulses and a high-voltage rectifier connected to one of the terminals of said secondary coil for rectifying the flyback pulses generated across said secondary coil, so that a high DC voltage is supplied to the anode of said cathode-ray tube; grid bias means for supplying a rid bias voltage to said grid; beam current responsive means including a resistor inserted between said power source and the other one of the terminals of said secondary coil for generating a control voltage having a value which changes inversely with respect to the change in said beam current, aid control voltage being equal to or lower than said grid bias voltage while said beam current is equal to or larger than a predetermined value, respectively; and switching means responsive to a voltage corresponding to the difference between said grid bias voltage and said control voltage so as to be rendered nonconductive while said beam current is equal to or larger than said predetermined value; said grid bias means being connected to said grid through said switching means to supply said grid bias voltage when said switching means is in a conductive condition, said control voltage being supplied to said grid when said switching means is in a nonconductive condition, thereby preventing the beam current from exceeding said predetermined value.

5. A beam current limiting circuit for a cathode-ray tube having at least a cathode, a grid and an anode comprising: a video signal output circuit connected to said cathode for supplying thereto video signals which control a beam current flowing through the anode of said cathode-ray tube; an anode circuit connected to said anode and comprising a power source, a flyback transformer including a primary coil and a secondary coil for generating flyback pulses and a high-voltage rectifier connected to one of the terminals of said secondary coil for rectifying the flyback pulses generated across said secondary coil, so that a high DC voltage is supplied to the anode of said cathode-ray tube; grid bias means for supplying a grid bias voltage to said grid; a resistor inserted between said power source and the other one of the terminals of said secondary coil for generating a control voltage having a value which changes inversely with respect to the change in said beam current, said control voltage being equal to or lower than said grid bias voltage at the grid of said cathode-ray tube while said beam current is equal to or larger than a predetermined value, respectively; and a diode having an anode connected to said grid and further connected to the junction between said resistor and the other one of the terminals of said secondary coil and a cathode connected to said grid bias means, so that said diode is supplied with a voltage corresponding to the difference between said control voltage and said grid bias voltage so as to be rendered nonconductive while said beam current is equal to or larger than said predetermined value and is to be held conductive while said beam current is lower than said predetermined value, said grid bias voltage being supplied therethrough to said grid when said diode is in a conductive condition, said control voltage being supplied to said grid when said diode is in a nonconductive condition, thereby preventing the beam current from exceeding said predetermined value.

6. A beam current limiting circuit for a color cathode-ray tube having a plurality of cathodes and their associated control grids and screen grids, a focusing electrode and an anode comprising: output circuit means including red, green and blue video signal output circuits connected to said cathodes, respectively; voltage adjusting means including red, green and blue screen grid voltage regulators connected to said screen grids, respectively; a focusing circuit connected to said focusing electrode; grid bias means for supplying a grid bias voltage to said control grids; an anode circuit connected to said anode comprising a power source, a flyback transformer including a primary coil and a secondary coil for generating flyback pulses and a high voltage rectifier connected to one of the terminals of said secondary coil for rectifying the flyback pulses generated across said secondary coil, so that a high DC voltage is supplied to said anode of said cathode-ray tube; beam current responsive means including a parallel circuit of a resistor and a condenser inserted between said power source and the other one of the terminals of said secondary coil for generating a control voltage having a value which changes inversely with respect to the change in said beam current, said control voltage having a value equal to or lower than said grid bias voltage when said beam current is equal to or larger than a predetermined value, respectively; and switching means having conductive and nonconductive states and being responsive to said control voltage to selectively supply to said grids either said grid bias voltage in response to said beam current being equal to or less than a predetermined value or said control voltage in response to said beam current being larger than said predetermined value, thereby preventing said beam current from exceeding said predetermined value.